(12) United States Patent
Seto et al.

(10) Patent No.: US 12,338,874 B2
(45) Date of Patent: Jun. 24, 2025

(54) VALVE DRIVING DEVICE AND SHOCK ABSORBER USING THE SAME

(71) Applicant: Hitachi Astemo, Ltd., Hitachinaka (JP)

(72) Inventors: Shinji Seto, Tokyo (JP); Ryuichi Suka, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 447 days.

(21) Appl. No.: 17/917,712

(22) PCT Filed: Apr. 13, 2021

(86) PCT No.: PCT/JP2021/015343
§ 371 (c)(1),
(2) Date: Oct. 7, 2022

(87) PCT Pub. No.: WO2021/215308
PCT Pub. Date: Oct. 28, 2021

(65) Prior Publication Data
US 2023/0160451 A1 May 25, 2023

(30) Foreign Application Priority Data
Apr. 22, 2020 (JP) .................................. 2020-076022

(51) Int. Cl.
*F16F 9/46* (2006.01)
*F16K 27/02* (2006.01)
(Continued)

(52) U.S. Cl.
CPC .............. *F16F 9/46* (2013.01); *F16K 27/029* (2013.01); *F16K 31/0675* (2013.01); *H01F 7/16* (2013.01)

(58) Field of Classification Search
None
See application file for complete search history.

(56) References Cited

U.S. PATENT DOCUMENTS

| 2016/0025237 A1 | 1/2016 | Mori et al. |
| 2016/0089950 A1 | 3/2016 | Yamaguchi |

(Continued)

FOREIGN PATENT DOCUMENTS

| CN | 107004489 A | 8/2017 | |
| DE | 102012201963 A1 * | 8/2013 | .............. F16F 9/464 |

(Continued)

OTHER PUBLICATIONS

DE-102012201963-A1—English Machine Translation (Year: 2013).*
(Continued)

*Primary Examiner* — Melanie Torres Williams
(74) *Attorney, Agent, or Firm* — Volpe Koenig

(57) ABSTRACT

The present invention aims to provide a valve driving device that suppresses an increase in size and improves thrust. The present invention includes a bobbin including a body portion, a solenoid coil wound around the body portion of the bobbin, an armature arranged on a radially inner side of the bobbin and fixed to a rod, an anchor that covers one side in an axial direction of the armature at a position on the radially inner side of the bobbin, a yoke partially arranged between the bobbin and the anchor, and a cylindrical member arranged between the bobbin and the armature. The bobbin includes a recessed portion on the radially inner side, and a part of the cylindrical member is inserted into the recessed portion. A part of the cylindrical member and the recessed portion are arranged so as to be laminated in the radial direction.

10 Claims, 2 Drawing Sheets

(51) Int. Cl.
*F16K 31/06* (2006.01)
*H01F 7/16* (2006.01)

(56) References Cited

U.S. PATENT DOCUMENTS

| | | |
|---|---|---|
| 2017/0350528 A1 | 12/2017 | Fukunaga |
| 2018/0266514 A1 | 9/2018 | Mori |

FOREIGN PATENT DOCUMENTS

| | | | | |
|---|---|---|---|---|
| DE | 102012223430 A1 * | 6/2014 | ............. | F16K 31/06 |
| JP | 2002-139167 A | 5/2002 | | |
| JP | 4161151 B2 * | 10/2008 | | |
| JP | 2012-094558 A | 5/2012 | | |
| JP | 5120629 B2 * | 1/2013 | ............. | F16F 9/464 |
| JP | 2014-173716 A | 9/2014 | | |
| JP | 2016-035302 A | 3/2016 | | |
| JP | 2019-015312 A | 1/2019 | | |
| JP | 2019-027460 A | 2/2019 | | |
| JP | 2020-017499 A | 1/2020 | | |
| WO | 2014/155662 A1 | 10/2014 | | |
| WO | 2017/073219 A1 | 5/2017 | | |
| WO | 2019/130682 A1 | 7/2019 | | |

OTHER PUBLICATIONS

JP-5120629-B2—English Machine Translation (Year: 2013).*
JP-4161151-B2—English Machine Translation (Year: 2018).*
JP-4161151-B2—English Machine Translation (Year: 2014).*
International Search Report, PCT/JP2021/015343, Jul. 6, 2021, 2 pgs.
Chinese Office Action issued on Jan. 23, 2025 for Chinese Patent Application No. 202180027285.6.

* cited by examiner

VALVE DRIVING DEVICE AND SHOCK ABSORBER USING THE SAME

TECHNICAL FIELD

The present invention relates to a valve driving device and a shock absorber using the same.

BACKGROUND ART

A conventional damping force adjustment type shock absorber includes, for example, a technique described in Patent Literature 1. The damping force adjustment type shock absorber described in Patent Literature 1 includes a damping force generation means that generates a damping force therein and a solenoid case in which a solenoid that drives the damping force generation means is accommodated. The flow of working fluid accompanying the movement of the piston in the cylinder is controlled by the damping force generation means in the solenoid case.

CITATION LIST

Patent Literature

PTL 1: JP 2019-27460 A

SUMMARY OF INVENTION

Technical Problem

The solenoid that drives the damping force generation means includes a coil wound around a bobbin, a pair of cores inserted into the coil, a plunger supported movably in the axial direction between the pair of cores, and an operating rod coupled to the plunger.

In the damping force adjustment type shock absorber, thrust is required to be increased in order to increase an adjustment range of the damping force. In addition, the size of the damping force adjustment type shock absorber is required to be reduced to improve mountability to a vehicle or the like.

In order to increase the thrust in the damping force adjustment type shock absorber, the diameter of the plunger needs to be increased. In the technique described in Patent Literature 1, when an attempt is made to increase the diameter of the plunger, the inner diameter of the coil also has to be increased, and the core and the solenoid case are also increased accordingly, whereby the size of the shock absorber increases.

An object of the present invention is to solve the above problems, and to provide a valve driving device capable of suppressing an increase in size and improving thrust, and a shock absorber using the same.

Solution to Problem

In order to achieve the above object, the present invention provides a valve driving device for a damping force adjustment type shock absorber, the valve driving device including a bobbin with a cylindrical body portion; a coil wound around the body portion of the bobbin; an armature that is arranged on a radially inner side of the bobbin and fixed to a rod; an anchor that covers one side in an axial direction of the armature at a position on a radially inner side of the bobbin; a yoke partially arranged between the bobbin and the anchor; and a cylindrical member arranged between the bobbin and the armature, where the bobbin includes a recessed portion on the radially inner side, a part of the cylindrical member is inserted into the recessed portion, the one part of the cylindrical member and the recessed portion are arranged so as to be laminated in the radial direction, and the armature operates in an axial direction to take a position where the one part of the cylindrical member and the recessed portion are laminated and a position where the one part of the cylindrical member and the recessed portion are not laminated in the radial direction.

Advantageous Effects of Invention

According to the present invention, a valve driving device capable of suppressing an increase in size and improving thrust, and a shock absorber using the same can be provided.

DESCRIPTION OF EMBODIMENTS

Hereinafter, examples of a shock absorber according to the present invention will be described with reference to the drawings. Note that the present invention is not limited to the following examples, and various modifications and application examples are included in the scope of the technical concept of the present invention.

First Example

Figure 1:
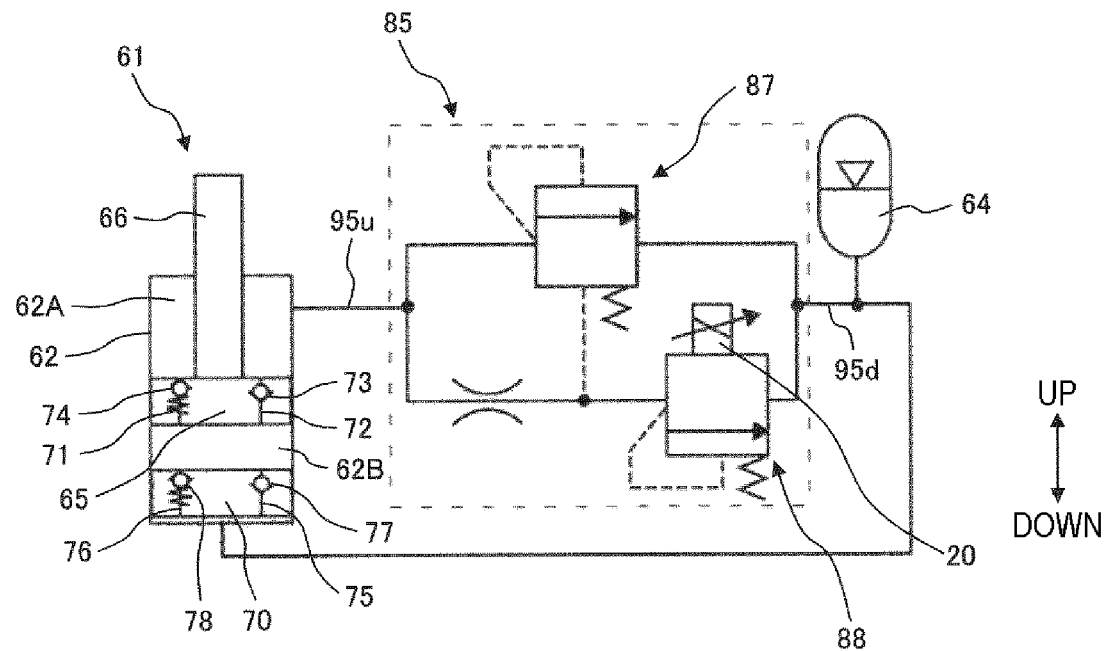
FIG. 1 is a diagram illustrating a hydraulic circuit of a main component in a shock absorber according to a first example of the present invention.
Figure 2:
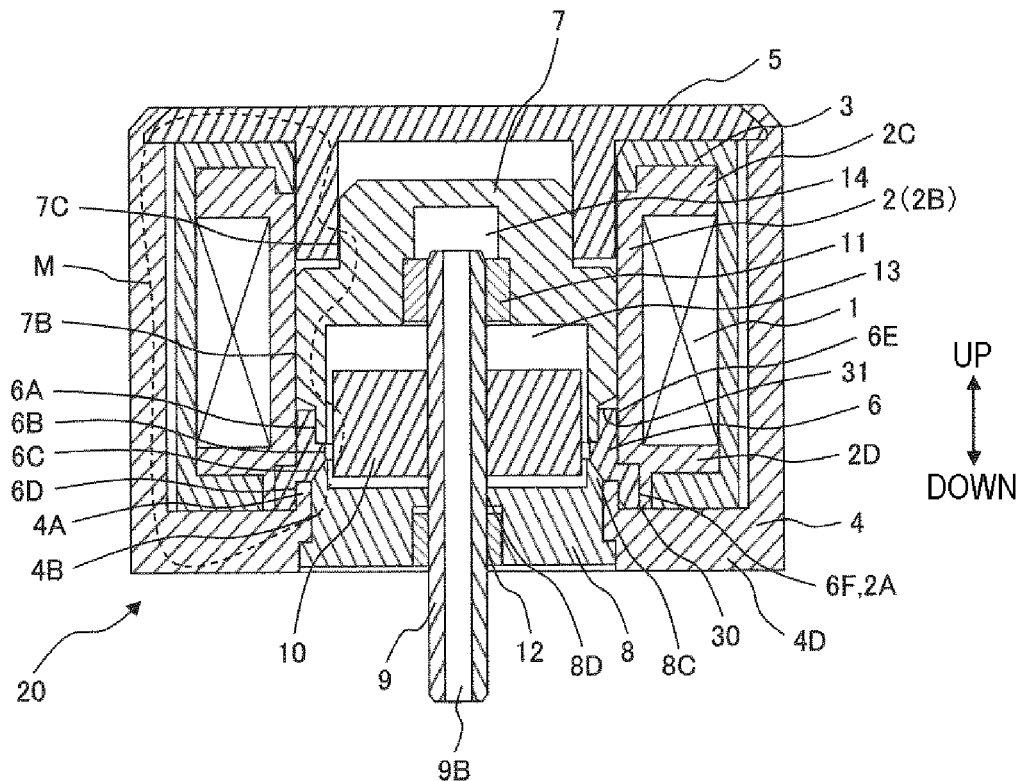
FIG. 2 is a cross-sectional view of an electromagnetic solenoid according to the first example of the present invention.

A first example of the present invention will be described with reference to FIGS. 1 and 2. FIG. 1 is a diagram illustrating a hydraulic circuit of a main component in a shock absorber according to a first example of the present invention. In FIG. 1, a damping force adjustment type shock absorber is configured. In the following description, an upward direction (upper side) and a downward direction (lower side) in FIG. 1 are referred to as an upward direction (upper side) and a downward direction (lower side) in a shock absorber 61, and the vertical direction is illustrated in each drawing. In addition, a direction in which a rod 9 extends (vertical direction) is referred to as an axial direction, a direction orthogonal to the axial direction of the rod 9 is referred to as a radial direction, a direction approaching the rod 9 is referred to as a radially inner side, and a direction separating from the rod 9 is referred to as a radially outer side. FIG. 2 is a cross-sectional view of an electromagnetic solenoid according to the first example of the present invention.

As shown in FIG. 1, the shock absorber 61 of the first example is configured by a tubular cylinder 62, a reservoir 64, and a damping force generation means 85. The shock absorber 61 is mounted between two relatively movable members on a sprung (vehicle body) side, an unsprung (wheel) side, and the like of a suspension device of a vehicle (not illustrated).

A piston 65 is slidably fitted in the cylinder 62, so that the inside of the cylinder 62 is divided into a cylinder upper chamber 62A and a cylinder lower chamber 62B by the piston 65.

A piston rod 66 is coupled to the piston 65, and an end of the piston rod 66 on a side opposite to the piston 65 passes through the cylinder upper chamber 62A and projects out to the outside of the cylinder 62 through an oil seal (not illustrated). On the lower end side of the cylinder 62, a base valve 70 that divides the cylinder lower chamber 62B and the reservoir 64 is provided.

One of the reservoirs 64 is connected to the cylinder upper chamber 62A of the cylinder 62, and the other reservoir 64 is connected to the cylinder lower chamber 62B of the cylinder 62 by way of the base valve 70. A damping force generation means 85 is provided between the cylinder 62 and the reservoir 64. In the first example, the damping force generation means 85 is connected between one of the reservoirs 64 and the cylinder upper chamber 62A.

The piston 65 is provided with passages 71 and 72 that communicate the cylinder upper chamber 62A and the cylinder lower chamber 62B. The passage 72 is provided with a check valve 73 that allows only the flow of fluid from the cylinder lower chamber 62B to the cylinder upper chamber 62A, and the passage 71 is provided with a relief valve 74 that opens when the pressure of the fluid on the cylinder upper chamber 62A side reaches a predetermined pressure and relieves the fluid toward the cylinder lower chamber 62B side.

The base valve 70 is provided with passages 76 and 75 that communicate the cylinder lower chamber 62B and the reservoir 64. The passage 75 is provided with a check valve 77 that allows only the flow of fluid from the reservoir 64 to the cylinder lower chamber 62B, and the passage 76 is provided with a relief valve 78 that opens when the pressure of the fluid on the cylinder lower chamber 62B side reaches a predetermined pressure and relieves the fluid toward the cylinder lower chamber 62B side.

In the damping force generation means 85, the upstream side 95u is connected to the cylinder upper chamber 62A side, and the downstream side 95d is connected to the reservoir 64. The damping force generation means 85 is configured by a substantially cylindrical case (not illustrated) on an outer side of the cylinder 62, a pilot-type main valve unit 87 on the inner side thereof, and a pilot valve unit 88 that controls the valve opening pressure of the main valve unit 87. The pilot valve unit 88 is driven by an electromagnetic solenoid 20 and functions as a pressure control valve. The electromagnetic solenoid 20 functions as a valve driving device.

The structure of the electromagnetic solenoid 20 will be described with reference to FIG. 2. FIG. 2 is a cross-sectional view of an electromagnetic solenoid 20 according to the first example of the present invention.

The electromagnetic solenoid 20 mainly includes a bobbin 2, a solenoid coil 1 (coil) wound around the bobbin 2, a yoke 4, an anchor 8, a housing 7, and an upper core 5 of a magnetic member arranged so as to cover the periphery of the solenoid coil 1, a rod 9 arranged so as to slidably move between the housing 7 and the anchor 8 by way of a bush 12 at the center thereof, and an armature 10 of a magnetic member fixedly arranged on the rod 9. The armature 10 of the first example is configured such that the axial length is shorter than the radial length (diameter).

The yoke 4 is formed in a cylindrical shape having a bottom portion 4D on the lower side in the vertical direction (axial direction), and a through hole 4B penetrating in the vertical direction (axial direction) is formed at the center portion. A convex portion 4A extending toward the upper side in the vertical direction (axial direction) is formed at the center portion of the yoke 4. The convex portion 4A, which is a part of the yoke 4, is arranged between the bobbin 2 and the anchor 8.

The anchor 8 is formed in a cylindrical shape and is arranged to cover one side (lower side) in the axial direction of the armature 10 at a position on the radially inner side of the bobbin 2. A through hole 8D communicating in the vertical direction (axial direction) is formed at a center portion of the anchor 8. The rod 9 is inserted into the through hole 8D. A protruding portion 8C extending upward in the vertical direction (axial direction) is formed on the radially outer side of the anchor 8. The protruding portion 8C has a shape having an inclined portion in which a radially central side is long and a radially outer side (outer periphery) is short when viewed in a cross section. A recessed portion in which the bush 12 is arranged is provided at a lower part of the through hole 8D of the anchor 8. The anchor 8 is arranged in a manner of being press-fitted into the radially inner side (inner peripheral side) of the through hole 4B of the yoke 4.

A cylindrical member 6 of a non-magnetic body and formed in a substantially cylindrical shape is fixedly arranged so as to lie along a radially outer side (outer periphery) of the convex portion 4A on an upper surface on a bottom surface side of the yoke 4. That is, the cylindrical member 6 is arranged between the bobbin 2 and the armature 10. The outer diameter of the cylindrical member 6 is formed in a stepped form and includes a small outer diameter portion 6E having a small outer diameter on the upper side, and a large outer diameter portion 6F having a large outer diameter on the lower side. The inner diameter of the cylindrical member 6 is configured of, from the top, an upper large diameter portion 6A having a large diameter, a small diameter portion 6B formed by decreasing the diameter in a stepped form, a diameter enlarged portion 6C formed by increasing the diameter in a tapered form, and a lower large diameter portion 6D formed by increasing the diameter in a stepped form. The lower large diameter portion 6D is fitted to the radially outer side (outer periphery) of the convex portion 4A of the yoke 4. The diameter enlarged portion 6C is formed so as to face the inclined portion of the protruding portion 8C of the anchor 8.

A bottomed cylindrical housing 7 having a cylindrical hole is provided on an upper part of the cylindrical member 6. The housing 7 is arranged so as to cover the other side in the axial direction of the armature 10. The outer side of the housing 7 is fitted to the inner periphery of the upper large diameter portion 6A of the cylindrical member 6. The housing 7 is formed to have a large outer diameter portion 7B in which the outer diameter has a larger diameter than the lower end side, and a small outer diameter portion 7C in which a step portion is provided so that the diameter is smaller on the upper side. The lower end of the housing 7 is arranged so as to come into contact with the step portion of the inner diameter of the cylindrical member 6.

A bush 12 is arranged in a recessed portion at the lower part of the through hole 8D of the anchor 8, and the rod 9 is supported to be movable in the vertical direction (axial direction) by way of the bush 12.

The armature 10, which is also referred to as a movable iron core, is formed in a substantially cylindrical shape by an iron-based magnetic body, and the rod 9 is fixed to the inner side of the cylinder. The outer diameter of the armature 10 is slightly smaller than the inner diameter of the protruding portion 8C of the anchor 8, and is arranged so as to be movable in the vertical direction on the inner side.

The rod 9 is formed in a cylindrical shape and has an in-rod passage 9B penetrating the rod 9 in the axial direction (vertical direction).

The bobbin 2 is arranged on the outer side of the housing 7 and the cylindrical member 6, and includes a cylindrical body portion 2B and flange portions 2C and 2D formed above and below the body portion 2B and respectively extending to the radially outer side from upper and lower ends (axial ends) of the body portion 2B. Since the bobbin 2 includes the flange portions 2C and 2D, the radially outer side of the body portion 2B is opened. The bobbin 2 is made of resin or the like.

The solenoid coil 1 is configured by winding a conductor such as a copper wire around the body portion 2B of the bobbin 2 in multiple layers by a predetermined number of turns. The outer peripheral side of the solenoid coil 1 is insulated by molding with the resin 3. The movement of the solenoid coil 1 wound around the body portion 2B of the bobbin 2 is regulated in the vertical direction by the flange portions 2C and 2D.

A recessed portion 2A is provided on a lower end inner diameter side (radially inner side) of the flange portion of the bobbin 2. A part (large outer diameter portion 6F) of the cylindrical member 6 is inserted into the recessed portion 2A. The recessed portion 2A of the bobbin 2 and the one part (large outer diameter portion 6F) of the cylindrical member 6 are arranged so as to be laminated in the radial direction. The convex portion 4A, which is a part of the yoke 4, is arranged so as to be laminated with the recessed portion 2A of the bobbin 2 and the one part (large outer diameter portion 6F) of the cylindrical member 6 in the radial direction.

The lead wire connected to the solenoid coil 1 is taken out from the upper part of the bobbin 2 (not illustrated), and can be energized from the outside via a wire connecting portion.

An upper core 5 is arranged at the upper part of the housing 7. The upper core 5 has a shape in which a cylindrical portion projects out to the lower side from a circular plate, and is formed such that the small outer diameter portion 7C of the housing 7 is accommodated on the inner diameter side of the cylinder. The outer side of the circular plate is fixed to the upper end of the yoke 4 by caulking or the like. On the inner diameter side of the cylindrical hole of the housing 7, the rod 9 is supported so as to be movable in the vertical direction (axial direction) by way of a bush 11.

Although not illustrated, an oil chamber of a pilot valve unit 88 is formed at a lower part of the yoke 4, a valve valve body is arranged at a lower part of the rod 9 in the oil chamber, and the valve is opened and closed with the vertical operation of the rod 9 to control the pressure. Therefore, the oil chamber 13 formed around the armature 10 and the back pressure chamber 14 at the upper end of the rod communicate with the oil chamber of the pilot valve unit 88 and are filled with fluid. The oil chamber 13 is a moving range in the axial direction of the armature 10. The armature 10 is located at a position where the recessed portion 2A of the bobbin 2 and the large outer diameter portion 6F of the cylindrical member 6 overlap in the radial direction in a state of being located on the axially lower side, and is located at a position where the recessed portion 2A of the bobbin 2 and the large outer diameter portion 6F of the cylindrical member 6 do not overlap in the radial direction in a state of being located on the axially upper side. That is, the armature 10 operates in the axial direction so as to be able to take a position where the recessed portion 2A of the bobbin 2 and the large outer diameter portion 6F of the cylindrical member 6 are laminated and a position where they are not laminated in the radial direction. In the first example, a necessary operation range can be secured in the axial direction of the electromagnetic solenoid 20 while suppressing an increase in size of the electromagnetic solenoid 20, and thus a range of component and product application can be expanded.

The cylindrical member 6 and the housing 7 are brazed by heating with a brazing material arranged at a position on the inner peripheral side 31 of the upper end of the cylinder. The yoke 4 and the cylindrical member 6 are brazed by heating with a brazing material arranged at a position on the outer peripheral side 30 of the lower end of the cylinder. With this configuration, the fluid is suppressed from leaking from the housing 7 or the inner side of the upper end of the anchor 8 to the solenoid coil 1 side.

Next, the operation of the shock absorber 61 will be described. In the extension stroke of the piston rod 66, the check valve 73 of the piston 65 is closed by the movement of the piston 65 in the cylinder 62, and before the opening of the relief valve 74, the fluid on the cylinder upper chamber 62A side is pressurized to flow into the damping force generation means 85. The flowed fluid flows into the reservoir 64 through the main valve unit 87 and the pilot valve unit 88.

At this time, the fluid worth the movement of the piston 65 opens the check valve 77 of the base valve 70 from the reservoir 64 and flows into the cylinder lower chamber 62B. When the pressure of the cylinder upper chamber 62A reaches the valve opening pressure of the relief valve 74 of the piston 65, the relief valve 74 opens to relieve the pressure of the cylinder upper chamber 62A to the cylinder lower chamber 62B, thereby preventing an excessive increase in the pressure of the cylinder upper chamber 62A.

In the contraction stroke of the piston rod 66, the check valve 73 of the piston 65 is opened and the check valve 77 of the passage 75 of the base valve 70 is closed by the movement of the piston 65 in the cylinder 62, and before the opening of the relief valve 78, the fluid in the cylinder lower chamber 62B flows into the cylinder upper chamber 62A, and the fluid worth the amount of the piston rod 66 entering the cylinder 62 flows from the cylinder upper chamber 62A to the reservoir 64 through the path same as in the extension stroke described above. When the pressure in the cylinder lower chamber 62B reaches the valve opening pressure of the relief valve 78 of the base valve 70, the relief valve 78 opens to relieve the pressure of the cylinder lower chamber 62B to the reservoir 64, thereby preventing an excessive increase in the pressure in the cylinder lower chamber 62B.

As a result, at the time of the expansion/contraction strokes of the piston rod 66, in the damping force generation means 85, the pilot valve unit 88 generates a damping force with respect to the piston 65 before the opening of the main valve unit 87 (piston speed low speed region), and generates the damping force according to the opening degree after the opening of the main valve unit 87 (piston speed high speed region side). The damping force can be adjusted by adjusting the control pressure of the pilot valve unit 88 by the energizing current to the solenoid coil 1. As a result, the internal pressure of the back pressure chamber (not illustrated) of the main valve unit 87 changes, and the valve opening pressure and the opening degree of the main valve unit 87 can be adjusted.

Next, the operation of the electromagnetic solenoid 20 will be described. When the solenoid coil 1 is energized, the solenoid coil 1 is excited, a flow of magnetic flux is generated by a magnetic field generated by the excitation as indicated by a line M in the drawing, and thrust in a direction of attracting to the anchor 8 in the axial direction is generated in the armature 10. At this time, it is necessary to cause the flow of the magnetic flux to mainly pass through the armature 10, the protruding portion 8C of the anchor 8, or the upper surface 8A of the convex portion 4A from the lower side of the housing 7 in order to efficiently generate the thrust. For this purpose, a non-magnetic portion is required between the lower side of the housing 7 and the protruding portion 8C of the anchor 8, and the cylindrical member 6 plays that role.

In addition, since the protruding portion 8C needs to concentrate the magnetic flux, the outer diameter side of the protruding portion 8C also needs to be a non-magnetic body. The cylindrical member 6 on the outer diameter side of the protruding portion 8C plays such a role.

On the other hand, it is necessary to prevent the fluid from leaking to the solenoid coil 1 side on the outer peripheral side of the oil chamber 13 around the armature 10. In addition, since the pressure of the oil chamber 13 increases, the members around the oil chamber need to have the strength to be able to hold the pressure, and deformation due to the pressure is desirably suppressed as much as possible. Furthermore, since the anchor 8 is press-fitted into the yoke 4, deformation at the time of press-fitting needs to be suppressed.

Therefore, the protruding portion 8C and the convex portion 4A of the yoke need to have a necessary thickness. On the other hand, when increasing the thrust, it is conceivable to increase the diameter of the armature 10 and increase the number of windings of the solenoid coil 1. When the diameter of the armature 10 is simply increased, the area of the solenoid coil 1 is reduced by increasing the inner diameter side of the solenoid coil 1, but in the first example, the recessed portion 2A is provided on the inner side at the lower end of the bobbin 2 and the large outer diameter portion 6F of the cylindrical member 6 is arranged to be accommodated in that portion. Furthermore, since the convex portion 4A of the yoke 4 is arranged so as to be accommodated in the recessed portion formed in the diameter enlarged portion 6C corresponding to the inner diameter side of the cylindrical member 6, and the protruding portion 8C of the anchor 8 is arranged on the inner side of the cylindrical member 6, a structure that allows the strength of the convex portion of the yoke 4 and the protruding portion 8C of the anchor 8 to be secured without reducing the area required for the solenoid coil 1 is obtained. As a result, the diameter of the armature 10 can be increased without reducing the area of the solenoid coil 1, and the thrust can be increased if the number of windings is the same. Therefore, if the outer diameter of the electromagnetic solenoid 20 is the same, the thrust can be increased by increasing the diameter of the armature 10 without reducing the number of windings required for the solenoid coil 1. In addition, when the required thrust is the same, the number of windings of the solenoid coil can be reduced, and downsizing can be achieved by reducing the axial length and the outer diameter.

In addition, in a case where the solenoid coil 1 of the first example is used in a damping force adjustment type shock absorber, it is possible to improve mountability to a vehicle or the like and increase a degree of freedom of arrangement by shortening an axial length, shortening an outer diameter, or the like. Furthermore, since the thrust can be increased, there is an advantage that the damping force adjustment range can be further increased. In addition, if the generated thrust is the same, the required current can be reduced, and energy saving can be achieved.

Second Example

Figure 3:
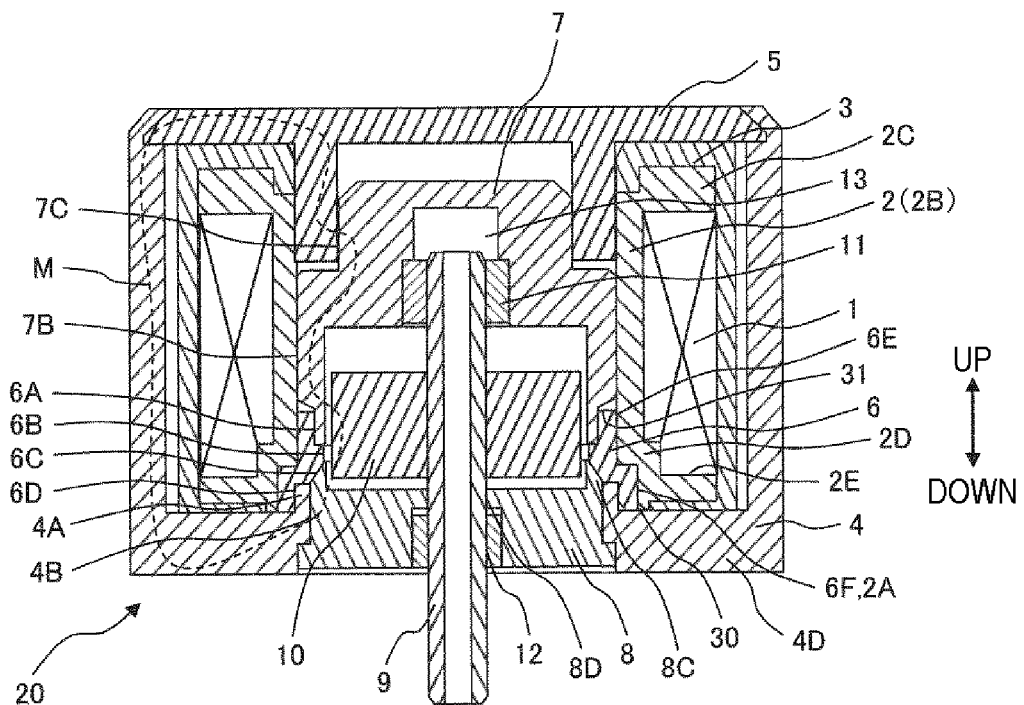
FIG. 3 is a cross-sectional view of an electromagnetic solenoid according to a second example of the present invention.

A second example of the present invention will be described with reference to FIG. 3. FIG. 3 is a cross-sectional view of an electromagnetic solenoid according to the second example of the present invention. Configurations common to the first example are denoted with the same reference numerals, and a detailed description thereof will be omitted.

The second example is different from the first example in the shape of the portion in which the bobbin and the solenoid coil 1 are accommodated.

As illustrated in FIG. 3, the flange portion 2D located on the lower side of the bobbin 2 is provided with a step portion 2E formed in a stepped form toward the lower side (axially outer side). The solenoid coil 1 is wound at the position of the step portion 2E. That is, by forming the step portion 2E lowered in a stepped form toward the lower side (axially outer side) from the upper surface of the flange portion 2D, the number of windings of the solenoid coil 1 wound around the bobbin 2 can be increased. A recessed portion 2A is provided on the radially inner side of the step portion 2E.

According to the second example, effects similar to those of the first example can be obtained, and at the same time, the solenoid coil 1 can be wound more around the portion of the step portion 2E, so that the thrust can be further improved, the axial length can be shortened and the diameter can be reduced accordingly, and the size can be further reduced.

Third Example

Figure 4:
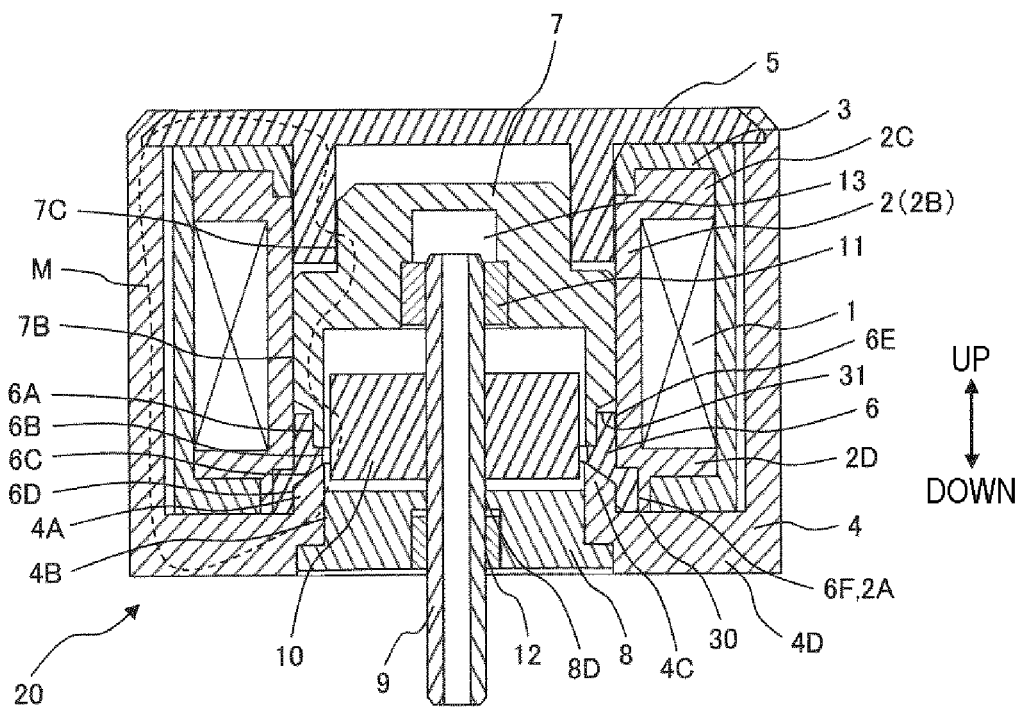
FIG. 4 is a cross-sectional view of an electromagnetic solenoid according to a third example of the present invention.

A third example of the present invention will be described with reference to FIG. 4. FIG. 4 is a cross-sectional view of an electromagnetic solenoid according to the third example of the present invention. Configurations common to the first example and the second example are denoted with the same reference numerals, and a detailed description thereof will be omitted.

The third example is different from the first and second examples mainly in the shapes of an anchor 8, a yoke 4, and a cylindrical member 6.

The anchor 8 is formed in a cylindrical shape, and a through hole 8D communicating in the vertical direction (axial direction) is formed at the center portion. The protruding portion 8C extending toward the upper side in the vertical direction (axial direction) is formed at the center portion of the anchor 8 in the first example and the second example, but the third example is different from the first example and the second example in that the protruding portion 8C is not formed.

The yoke 4 is formed in a cylindrical shape having a bottom portion 4D on the lower side in the vertical direction (axial direction), and a through hole 4B penetrating in the vertical direction (axial direction) is formed at the center portion. A protruding portion 4C extending upward in the vertical direction (axial direction) is formed at the center portion of the yoke 4. The protruding portion 4C has a shape having an inclined portion in which a radially central side is high and a radially outer side is low when viewed in a cross section.

A cylindrical member 6 of a non-magnetic body is fixedly arranged so as to lie along the radially outer side (outer periphery) of the protruding portion 4C on an upper surface of the bottom portion 4D of the yoke 4.

The cylindrical member 6 is formed in a substantially cylindrical shape. The outer diameter of the cylindrical member 6 is formed in a stepped form, and includes a small outer diameter portion 6E in which a diameter on the upper side in the vertical direction (axial direction) is formed small, and a large outer diameter portion 6F in which a diameter on the lower side in the vertical direction (axial direction) is formed large. The inner diameter of the cylindrical member 6 includes, from the upper side in the axial direction, an upper large diameter portion 6A having a large diameter, a small diameter portion 6B formed by reducing the diameter in a stepped form from the upper large diameter portion 6A, a diameter enlarged portion 6C in which the diameter expands in a tapered form from the small diameter portion 6B, and a lower large diameter portion 6D connected to the diameter enlarged portion 6C. The lower large diameter portion 6D is fitted to the radially outer side (outer periphery) of the protruding portion 4C of the yoke 4. The diameter enlarged portion 6C is formed so as to face the inclined portion of the protruding portion 4c of the yoke 4.

With the above configuration, in the third example, effects similar to those of the first example can be obtained, and the protruding portion 8C of the yoke 4 can have a thicker thickness, so that deformation of the protruding portion 8C at the time of press-fitting or brazing can be suppressed. Furthermore, in the third example, deformation when the fluid pressure is generated can also be suppressed.

In the first to third examples, the yoke 4 and the anchor 8 are configured as separate bodies, but the yoke 4 and the anchor 8 may be integrally configured. In this case, the protruding portion 4C and the protruding portion 8C are integrally configured.

Note that the present invention is not limited to the examples described above, and includes various modifications. For example, the examples described above have been described in detail for the sake of easy understanding of the present invention, and are not necessarily limited to those having all the described configurations.

REFERENCE SIGNS LIST 1 solenoid coil
2 bobbin
2A recessed portion
3 resin
4 yoke
5 upper core
6 cylindrical member
6F large outer diameter portion
7 housing
8 anchor
9 rod
10 armature
11, 12 bush
13 oil chamber
20 electromagnetic solenoid
61 shock absorber
62 cylinder
64 reservoir
85 damping force generation means
87 main valve unit
88 pilot valve unit

The invention claimed is:

1. A valve driving device for a damping force adjustment type shock absorber, the valve driving device comprising:
   a bobbin with a cylindrical body portion; a coil wound around the body portion of the bobbin;
   an armature that is arranged on a radially inner side of the bobbin and fixed to a rod; an anchor that covers one side in an axial direction of the armature at a position on a radially inner side of the bobbin;
   a yoke partially arranged between the bobbin and the anchor; and
   a cylindrical member arranged between the bobbin and the armature,
   wherein
   the bobbin includes a recessed portion on the radially inner side,
   a part of the cylindrical member is inserted into the recessed portion,
   the one part of the cylindrical member and the recessed portion are arranged so as to be laminated in the radial direction, and
   the armature operates in an axial direction to take a position where the one part of the cylindrical member and the recessed portion are laminated and a position where the one part of the cylindrical member and the recessed portion are not laminated in the radial direction.

2. The valve driving device according to claim 1, wherein the cylindrical member is a non-magnetic body.

3. The valve driving device according to claim 2, wherein an outer diameter of the cylindrical member is formed in a stepped form and includes a small outer diameter portion and a large outer diameter portion, the large outer diameter portion being arranged in the recessed portion.

4. The valve driving device according to claim 1, further comprising a tubular housing that covers the other side in the axial direction of the armature, the housing being fitted to the cylindrical member.

5. The valve driving device according to claim 1, wherein a part of the yoke is arranged so as to be laminated with the recessed portion and the one part of the cylindrical member in the radial direction.

6. The valve driving device according to claim 1, wherein the yoke and the cylindrical member are brazed.

7. The valve driving device according to claim 1, wherein the anchor and the yoke are integrally formed.

8. The valve driving device according to claim 1, wherein the bobbin includes a flange portion extending toward a radially outer side from an axial end of the body portion, the flange portion including a step portion formed in a stepped form toward an axially outer side, and
the recessed portion is provided on a radially inner side of the step portion.

9. The valve driving device according to claim 1, wherein the yoke is arranged so as to cover a periphery of the coil.

10. A shock absorber comprising:
   a cylinder;
   a piston that slides in an inside of the cylinder and divides the inside of the cylinder into a cylinder upper chamber and a cylinder lower chamber; a piston rod coupled to the piston; a reservoir connected to each of the cylinder upper chamber and the cylinder lower chamber; and
   a damping force generation means provided between the cylinder and the reservoir, wherein
the damping force generation means includes a pilot valve unit that adjusts a damping force with respect to the piston and a valve driving device that controls the pilot valve unit, and
the valve driving device includes claim 1.

* * * * *